United States Patent [19]

Brown

[11] 4,097,404

[45] Jun. 27, 1978

[54] PROCESS FOR PROVIDING ENCAPSULATED TONER COMPOSITION

[75] Inventor: Robert Warren Brown, Rochester, N.Y.

[73] Assignee: Xerox Corporation, Stamford, Conn.

[21] Appl. No.: 327,528

[22] Filed: Jan. 29, 1973

[51] Int. Cl.² .............................................. B01J 13/02
[52] U.S. Cl. ................................ 252/316; 106/308 M; 252/62.1 P; 252/314; 427/221; 427/222
[58] Field of Search ........................... 252/62.1 P, 316; 117/100 A, 100 C; 427/222, 221

[56] References Cited

U.S. PATENT DOCUMENTS

| 2,969,331 | 1/1961 | Brynko et al. | 252/316 |
| 3,093,039 | 6/1963 | Rheinfrank | 252/62.1 X |
| 3,391,082 | 7/1968 | Maclay | 252/62.1 |
| 3,625,747 | 12/1971 | Kaneko et al. | 117/100 C |

FOREIGN PATENT DOCUMENTS

| 1,025,694 | 4/1966 | United Kingdom | 117/100 A |

Primary Examiner—Richard D. Lovering

[57] ABSTRACT

A simplified method of encapsulating toners is provided which comprises polymerization and coacervation resulting in a copolymer encapsulated in an incompatible shell polymer. Toner particles are prepared by mixing a solute polymer in a solvent monomer after which polymerization of the solvent monomer is initiated, resulting in a polymer from the solvent monomer which phase-separates from the solvent monomer to form a solvent-poor phase which eventually comprises the capsule core. The solvent-rich phase then provides the material for the capsule wall.

8 Claims, No Drawings

PROCESS FOR PROVIDING ENCAPSULATED TONER COMPOSITION

BACKGROUND OF THE INVENTION

This invention relates to electrostatography and more particularly to improved electrostatographic developing materials and the use thereof.

In electrostatography, more specifically recited in U.S. Pat. No. 2,297,691, a uniform electrostatic charge is placed on a photoconductive insulating layer, selectively exposed, and the resulting latent electrostatic image is developed to provide a visible reproduction of an original by depositing on the image a finely divided electroscopic marking material referred to in the art as "toner". Toner is normally attracted to those areas of the layer which retain a charge thereby forming a toner image corresponding to the electrostatic latent image. The image so produced may be transferred to a support surface or otherwise processed. The image may then be permanently affixed to the support surface employing conventional fixing methods such as heating or application of a suitable solvent.

Toner alone or in combination with a suitable carrier and additives, where appropriate, may be applied employing a number of development techniques among which are cascade, more fully defined in U.S. Pat. No. 2,618,552 to E. N. Wise; magnetic brush, more fully defined in U.S. Pat. No. 2,874,063; powder cloud, more fully defined by Carlson in U.S. Pat. No. 2,221,776; or touch-down development, as disclosed by Gundlach in U.S. Pat. No. 3,166,432; among others.

When fixing the final image by application of heat, problems in adapting such a technique to high-speed machines in view of the energy required to raise the temperature of the toner to the desired level, charring or combustion, and specifically adapting toner materials to these parameters for use in high-speed electrostatographic copying machines has resulted in the requirement for additional complex machinery and process techniques. The development of an appropriate toner material which will fuse under high-speed machine conditions and avoid blocking or caking, process readily and exhibit the appropriate triboelectric properties under changes in the ambient humidity has become a rather critical and demanding art in and of itself. Other characteristics and properties that must be controlled or eliminated in a desirable toner include the effects of impaction on the triboelectric properties, the abrasive nature of the toner, and bead sticking which is the adherence of carrier beads to a reusable photoconductor surface.

Toner particles are usually comprised of thermoplastic resins selected to have melting points significantly above any ambient temperature that might be encountered during electrostatic deposition. In addition to the developing powder or toner materials described in U.S. Pat. No. 2,297,691, a number of additional toner materials have been developed especially for use in the newer development techniques including the cascade development technique described above. Generally speaking, these new toner materials have comprised various improved resins mixed with different pigments such as carbon black and other colorants. Some examplary patents along this line include U.S. Pat. No. 2,659,670 to Copley which describes a toner resin as rosin modified phenyl formaldehyde, U.S. Pat. No. Re. 25,136 to Carlson which describes an electrostatographic toner employing a resin of polymerized styrene and U.S. Pat. No. 3,079,342 to Insalaco describing a plasticized copolymer resin in which the comonomers are styrene and a methacrylate selected from the group consisting of butyl, isobutyl, ethyl, propyl, and iso-propyl.

Generally these toners have been prepared by thoroughly mixing a heat softened resin and a colorant to form a uniform dispersion as by blending these ingredients in a rubber mill or the like and then pulverizing this material after cooling to form it into small particles. These toners, though they result in excellent image reproduction, do exhibit some disadvantages such as a rather wide range of particle sizes and the ability of the colored resin to be sufficiently pliable for high-speed pulverizing which results in an even wider range of particle sizes during pulverization. Other requirements of electrostatographic developers or toners including the requirements that they be stable in storage, non-agglomerative, have the proper triboelectric properties for developing and have a low melting point for heat fusing are only compounded by the additional requirements imposed by this toner forming process. It is, therefore, found that some developer materials, such as those containing toner particles made from low molecular weight resins though possessing desirable properties such as proper triboelectric characteristics, are unsuitable because they tend to cake, bridge, and agglomerate during handling and storage.

Electrostatographic developer materials which are pressure fixable have been considered in view of the above stated difficulties. However, it is found that the toner requirements for good machine performance tend to be diametrically opposed to the requirements for pressure fixing. That is, low toner impaction requires a high toner softening temperature and good mechanical strength while pressure fixing requires softening and viscous flow at room temperature. In addition, one of the problems with potential pressure fixible toners is the need to gently handle these materials prior to pressure fusion to paper or other suitable support medium so that these materials will not prefuse and cause impaction in the development chamber. Therefore, a balance must generally be made between a material which will pressure fix onto paper at low pressure but not yet impact in the development chamber. A major cause of such prefusion is the abrasive action of the tumbling carrier beads on the toner both in normal cascade development and magnetic brush development.

Electrostatographic toner materials which are capable of pressure fixing are desirable and advantageous since unencapsulated materials which undergo cold flow tend to form tacky images on the copy sheet which often offset to other adjacent sheets. Toner particles containing unencapsulated materials which undergo cold flow, tend to bridge, cake, and block during production and in the shipping container as well as in the electrostatographic imaging machine. Of course, the toner material should be capable of accepting a charge of the correct polarity such as when brought into rubbing contact with the surface of carrier materials in cascade, magnetic brush, or touch-down development systems. Further, it is found that some toner materials which possess many properties as aforementioned which would ordinarily be desirable in electrostatographic toners dispense poorly and cannot be used in automatic copying and duplicating machines. Still other toners dispense well but form images which are characterized by low density, poor resolution, or high background. Still other toners are unsuitable for processes where electrostatic transfer is employed.

Encapsulated toner materials have been provided by liquid phase separation from aqueous media, commonly called coacervation, more fully described in U.S. Pat. Nos. 2,800,457 and 2,800,458 to Green. However, these toner material such as those comprising encapsulated inks are found to be generally fragile, their shells are loose after fixing and tend to cause smearing of the developed image. In addition, these materials generally have poor electrostatographic properties since the encapsulated contents tend to diffuse through the shell material leading to alteration of the triboelectric properties. Further, broken liquid core materials adversely affect copy quality due to vertical and lateral bleeding resulting in poor resolution. In U.S. Pat. Nos. 3,080,250 and 3,386,822 capsules containing solvents which tackify some portion of the toner and help to fix the image are disclosed. However, these materials comprise encapsulated liquids and once the capsule is crushed, the contents will flow perceptively with little or no applied stress and undesirable vapors are usually present.

Other techniques of toner production are known including spray drying toner from a dyed resin solution as described in U.S. Pat. No. 2,357,809 to Carlson, but these particles tend to bleed dye and to be unstable under the influences of light, heat, and/or handling. Other spray drying techniques such as that disclosed in U.S. Pat. No. 3,338,991 to Insalaco require multistep processes which are time consuming requiring several handling procedures and containers and requiring the use of different solvents.

Microencapsulation or in situ polymerization techniques by dispersion polymerizing a monomer to produce the wall around a pre-formed core are associated with other problems such as inhibition of polymerization of the wall monomer and the formation of solid coreless wall polymer particles.

There is, therefore, a demonstrated need for the development of improved encapsulated toner materials.

It is, therefore, an object of this invention to provide a toner material which is devoid of the above noted deficiencies.

Another object of this invention is to provide a toner which is stable at toner fusing conditions and high-speed copying in duplicating machines.

Still another object of this invention is to provide an impaction resistant toner material.

Yet another object of this invention is to provide an encapsulated toner material which is readily processed.

Again, another object of this invention is to provide a toner material which is resistant to smearing, agglomeration, and may be fused readily with less heat energy.

Yet still another object of this invention is to provide a toner which reduces mechanical abrasion of electrostatic imaging surfaces and is effective at low initial electrostatic surface potentials to provide dense toner images.

Again, another object of this invention is to provide a toner which may be fused at higher rates with less pressure.

Yet still another object of this invention is to provide an encapsulated toner containing a core material which will flow perceptively only under significant applied stress and have sufficient cohesive strength to form a good bond between the capsule shell and an image substrate.

Yet again another object of this invention is to provide a simple and effective method of producing encapsulated toner materials having physical and chemical properties superior to those of known toners and developers.

These and other objects of the instant invention are obtained generally speaking by providing a simplified method of encapsulating toners by polymerization and coacervation resulting in a copolymer encapsulated in an incompatible shell polymer. Thus, toner particles are prepared by mixing a solute polymer in a solvent monomer after which polymerization of the solvent monomer is initiated resulting in a polymer from the solvent monomer which phase-separates from the solvent monomer to form a solvent-poor phase which eventually comprises the capsule core. The solvent-rich phase then provides the material for the capsule wall.

The dispersion polymerization of a solvent monomer to form the capsule core and the subsequent coating of this core with a solute polymer to complete the encapsulation is effected by employing two incompatible polymers with the polymer from the monomer solution phase-separating from its monomer solution to form the solvent-poor phase and eventually the capsule core. When coacervation occurs in such systems, the solvent-poor phase forms the core material; the solvent-rich phase is found to deposit as the wall material. Thus, for example, n-butylmethacrylate may be employed as the monomer solution which phase-separates when polymerized to form the solvent-poor phase and eventually the capsule core and a 65/35 styrene/n-butylmethacrylate copolymer may be employed as a solute polymer which during the aforesaid polymerization becomes the solvent-rich phase and is then deposited as the wall material.

Encapsulation is accomplished during the heterogeneous liquid-phase polymerization where, for example, a polymer A is dissolved in monomer B, and the materials are selected such that polymer A and polymer B are incompatible and phase-separate during the polymerization with polymer A forming a solvent-rich phase and polymer B forming a solvent-poor phase. When polymerization is completed, the polymer B will have coalesced as a capsule core and polymer A will deposit over the coalesced polymer B and form the capsule wall. Colorants are normally dispersed in the starting monomer solution if the product is intended to be colored toner particles. Conventional suspension and dispersion polymerization techniques which are well known in the art may be employed, and the continuous phase employed may either be aqueous or non-aqueous liquid materials.

The following three parameters generally control the combination of monomer and polymer A which may be employed in order that the polymerized monomer forms the core and the polymer the encapsulating wall: (1) polymer A is incompatible with polymer B; (2) polymer A is soluble in monomer B; and (3) polymer B will separate as the solvent-poor phase eventually resulting in the capsule core.

The polymer which eventually forms the capsule wall or polymer A may be any suitable polymer. Basically any organic polymeric material including homopolymers and copolymers may be employed as polymer A, subject to the following conditions: (1) a suitable monomer or monomers may be found in which it is soluble, the polymer of which it is incompatible with; and (2) it phase separates as the solvent-rich phase during polymerization of the solvent monomer. Polymer A, in addition, should be a solid as it will eventually deposit as the capsule wall and it should not contain unsaturation which can be activated at the reaction conditions for the solvent monomer. In addition, it is necessary that polymer A be insoluble or have a very limited solubility in the continuous liquid phase. Typical polymers include: olefin polymers, halo-olefin polymers, aliphatic vinyl and vinylidene polymers, such as poly(vinyl alcohol), poly(vinyl aldals), poly(vinyl ketals), vinyl ester polymers, vinyl and vinylidene halide polymers, vinyl ether polymers, poly(vinyl ketones); aromatic vinyl polymers, such as polystyrene, polyindene, and polyacenaphthalene; heterocyclic vinyl polymers such as poly(N-vinylcarbazole, poly(N-vinylpyrrolidone), and poly(vinylpyridine); acrylic and methacrylic polymers such as poly(acrylic acid), polyacrylates, polymethacrylates, polycrotonates, polyacrylonitriles, polyacrylamides, polymethacrylamides, polyacrolein, and poly(diacryls); polyethers, such as aldehyde polymers, dialdehyde polymers, ketene and ketone polymers, aromatic polyethers, 1,2-epoxide polymers, and higher cyclic ether polymers; polysulfides and polysulfones; aliphatic and aromatic polyesters; aliphatic and aromatic polyamides; polyureas; polyurethans; natural and modified natural polymers; and combinations of the above.

Any suitable monomer may be employed in the system of the instant invention which eventually forms polymer B or the capsule core. Monomer B which forms polymer B must be a mono- or polyethylenically unsaturated compound capable of undergoing free-radical or addition polymerization such as is normally employed in suspension or dispersion polymerization processes. The monomer should be liquid at the reaction conditions to act as a solvent for polymer A and to provide the necessary mobility for complete phase-separation and coalescence of the two polymer phases. The monomer and the polymer formed from it, polymer B, should be insoluble or have very limited solubility in a continuous liquid phase and polymer B must be incompatible with polymer A. Polymer B should be capable of phase-separating from the solvent monomer as the solvent poor phase and eventually coalesce to form the capsule core. Typical monomers include: acrylic acid and esters thereof, methacrylic acid and esters thereof, acrylonitrile, vinyl and vinylidene halides, vinyl esters, vinyl ethers, styrene and substituted styrenes, and combinations of the foregoing among others.

Any suitable initiator may be employed in the system of the present invention. Oil-soluble initiators are normally employed although water-soluble initiators may be used. The initiator employed is generally dissolved in the monomer phase. These initiators which are widely known include compounds such as organic peroxides, organic hydroperoxides, N-nitrosoacylanilides, triphenylmethylazobenzene, and aliphatic azobis-nitriles.

As before mentioned, the continuous phase of the polymerization system most commonly employed is water but organic liquids may also be employed as taught in U.S. Pat. No. 3,218,302. The continuous phase generally contains a suspending or granulating agent which agents are well known in the prior art and include compounds such as polyvinyl alcohol, polymethacrylamide, polyacrylic acid, and tricalcium phosphate for use in aqueous continuous phases; and compounds such as alkyl methacrylates, vinyl alkyl ethers, vinyl alkanoates, and alkyl vinyl sulfides, and most especially the copolymers of the above containing 1–30% of certain nitrogen containing mono ethylenically unsaturated monomers the copolymers of which have average molecular weights of $1 \times 10^6$ as taught in U.S. Pat. No. 3,218,302 where the continuous phase comprises organic liquids.

Any suitable oil-soluble surfactants which aid the dispersion of the colorant in the system of the instant invention may be employed. Typical oil soluble surfactants include: bis(trialkyl) esters of sodium sulfosuccinic acid, nonyl phenyl polyethoxy ethanol, alkylated poly vinyl pyrrolidone, phosphate monoglyceride, alkanolamides, sorbitan esters, and the like. These surfactants are generally employed to provide the desired results in a concentration of from about 0.1 to about 50 weight percent of the colorant.

Any suitable pigment may be employed in the system of the present invention. These pigments may be dispersed in the monomer with the addition of the aforementioned surfactants. Organic dyes, soluble in the monomer or polymer, may also be incorporated provided they do not alter the action of the initiator. Care should therefore be taken to eliminate incorporating free aryl, amine and phenolic groups in the dyestuff which may retard polymerization in a deleterious manner. Typical dispersed dyes include nitro-acetamine dyes such as Yellow 2 RZ - C.I. Disperse Yellow 1, azo dyes such as C.I. Disperse Orange 3, Disperse Red 1, C.I. Disperse Black 9, C.I. Blacks 18, 19, 16, 1, 7, 12, 24, and 27, anthraquinones such as C.I. Disperse Violet Celanthrene Red, C.I. Disperse Blue 9, diazo dyes such as C.I. Food Black 1 and amino ketone dyes such as C.I. Disperse Green 1.

Suitable pigments for use in the present invention include, for example, carbon blacks, Algol Yellow, Pigment Yellow 6, Benzidine Yellow, Vulcan Fast Yellow GR, Indofast Orange, Ortho Nitroaniline Orange, Vulcan Fast Orange GG, Irgazine Red, Paranitraniline Red, Toluidine Red, Permanent Carmine FB, Permanent Bordeaux FRR, Romanesta Red, Pigment Orange R, Vulcan Fast Rubine RF, Lake Red D, Lithol Red 2G, Double Ponceau R, Calamine Red MB, Pigment Scarlet 3B, Acid Alizarine Red B, Rhodamine 6G, Rhodamine B Lake, Methyl Violet B Lake, Gentian Violet Lake, Quinizarin, Victoria Pure Blue BO Lake, Ethylviolet Lake, Phthalocyanine Blue B Pr, Pigment Blue BCS, Peacock Blue Lake, Brilliant Green B, and the like.

Concentrations of components, i.e. the granulating agent or suspending agent, the continuous phase, the dispersed phase, polymer A, monomer B, colorant, initiator, and colorant dispersing agent may generally be employed in any suitable amount as is utilized in conventional polymerization techniques where applicable. For example, the granulating agent in the continuous phase may have a concentration of from 0.0001 to 10% based on the weight of the continuous phase and preferably 0.05 to 5% based on the weight of the continuous phase. The ratios of the continuous phase and the dispersed phase may vary from 1:1 to 15:1, respectively; and are preferred to be normally from 2:1 to 8:1, respectively. The ratios of polymer A to monomer B may vary from 5:1 to 1:99, respectively or preferably from 1:1 to 1:10, respectively. Although the amount of colorant employed may vary according to whether a dye or a pigment is employed, generally 3–20% pigment by weight of the toner material is employed while substantially smaller quantities are employed if the dye colorant is utilized. The polymerization initiator may be employed in a range from 0.1% to 10% by weight of the monomer depending on the specific initiator employed and the core properties desired. Adequate dispersion of the colorant is normally achieved when from about 0.1 to 50% dispersing aid based on the weight of the colorant is employed.

To further define the specifics of the present invention, the following examples are intended to illustrate and not limit the particulars of the present system. Parts and percentages are by weight unless otherwise indicated.

EXAMPLE I

The following reagents are employed in the amounts indicated as hereinafter described:

| | | | |
|---|---|---|---|
| n-butylmethacrylate | 140.0 gr | | |
| MA-140 (styrene butyl- methacrylate copolymer) | 60.0 gr | Monomer | |
| AIBN (azobisisobuty- ronitrile) | 8.0 gr | Phase | |
| Triton N-101 (nonylphenyl- polyethoxyethanol) | 2.0 gr | 218.5 used | |
| Molacco-H carbon black | 10.0 gr | | |
| Polyvinyl alcohol | 36.0 gr | Aqueous | |
| Water | 900 ml | Phase | |

The polyvinyl alcohol is dissolved in water and placed in the reaction kettle under a constant Argon sparge. The MA-140 and Triton N-101 are dissolved in the monomer. This monomer solution is divided into two portions with approximately ⅓ of the solution being used to dissolve the AIBN, which is found not to completely dissolve. The carbon black is dried at 100° C in vacuum for one hour and dispersed in the other ⅔ of the solution on the Polytron mixer for 15 minutes. The carbon black dispersion is allowed to set undisturbed for 2 hours. The two monomer portions are then recombined by stirring on the Polytron mixer for about 2 minutes. The monomer phase is dispersed in the aqueous phase at 800 RPM for about 15 minutes. The temperature is then raised and held constant at about 75° C by means of a large water bath and at the same time the stirring rate is decreased to 300 RPM. This condition is maintained for 1½ hours at which time the polymerization is substantially completed. The reaction mixture is then cooled to 25° C with stirring. The resulting polymer particles are then separated from the reaction mixture by filtration. The encapsulated toner so produced is applied employing a conventional cascade development system to a latent electrostatic image after which the visible image is fixed by application of pressure resulting in a sharp, clear reproduction of the original employed.

EXAMPLE II

The following materials are employed as hereinafter described to produce an encapsulated toner:

| | | |
|---|---|---|
| n-butylmethacrylate | 120.0 gr | |
| MA-140 | 80.0 gr | Monomer Phase |
| AIBN | 4.8 gr | |
| Triton N-101 | 2.0 gr | 107 gr used |
| Molacco-H carbon black | 10.0 gr | |
| Polyvinyl alcohol | 36.0 gr | Aqueous |
| Water | 900 ml | Phase |

The procedure as employed in Example I is again repeated with the exception that the monomer phase is dispersed in the aqueous phase at 800 RPM for 5 minutes and the polymerization is continued for 1½ hours. The carbon black dispersion in this run is found to be better than in Example I. The particle sizes are found to vary between 1 and 15 microns. The conversion rate in this synthesis is found to be 28.6% at a quarter hour and 100% at one half hour, with the polymerization appearing to be essentially completed after 25 minutes. The encapsulated toner particles are separated from the reaction mixture and employed in a xerographic imaging process as in Example I.

EXAMPLE III

The formulation as employed in Example I is again utilized with the exception that no Triton N-101 is present so that the formulation is as follows:

| | | |
|---|---|---|
| n-butylmethacrylate | 140.0 gr | |
| MA-140 | 60.0 gr | Monomer |
| AIBN | 4.2 gr | Phase |
| Molacco-H carbon black | 20.0 gr | 109 gr used |
| Polyvinyl alcohol | 27.0 gr | Aqueous |
| Water | 900 ml | Phase |

The procedure as employed in Example I is again repeated with the exception that the monomer phase is dispersed in the aqueous phase at 500 RPM for about 5 minutes. The temperature is maintained at about 65° C and stirring rate at about 200 RPM. The polymerization is carried on for about 2 hours. The carbon black dispersion which results is excellent with no clear particles noticed. The particle size range is extremely wide covering 3–250 microns. The conversion rates in this synthesis are found to be as follows: after ½ hour, 58.1%; 1 hour, 96.8%; and 1½ hours, substantially 100%. The encapsulated toner particles are separated from the reaction mixture and employed in a xerographic imaging process as in Example I. A stick-point of 70° C is found for this toner on a Koffler Hot Bench indicating encapsulation of the poly(n-butylmethacrylate) by the poly(65% styrene/35% n-butylmethacrylate). As employed in the examples, the term "stick-point" indicates a temperature at which a material adheres to a metallic substrate; for example, a continuous line of sample is equilibrated on a Koffler Hot Bench for about 2 hours and then gently brushed away. The "stick-point" is the lowest temperature at which the sample "sticks" to the metallic plate of the hot bench.

EXAMPLE IV

A solution of about 12 gr fine basic magnesium carbonate and 200 ml of distilled water is prepared and placed in a 1-liter reaction flask provided with a reflux condenser under constant Argon sparge. About 10 grams of polyvinyl acetate and 0.5 grams of a nonyl phenyl polyethoxy ethanol are dissolved in about 40 gr of p-chlorostyrene monomer. The monomer solution is divided into two portions with about ⅓ of the solution used to dissolve 0.2 gr of 0-tolyl peroxide. 5 gr of Mogul-L carbon black having been vacuum dried in 100° C for 1 hour is dispersed in the remaining monomer solution using a Waring blender equipped with Polytron attachment for about 15 minutes. The two monomer portions are combined by stirring with the Polytron for a few minutes. The monomer phase is dispersed in the aqueous phase at 800 RPM for about 5 minutes using a simple paddle stirrer. The temperature is raised to about 90° C and maintained by means of a large water bath while at the same time the stirring rate is slowed to about 300 RPM. The polymerization is continued for about 6 hours. The temperature is lowered to 25° C and the material is easily recovered by freeze drying. After washing with water and drying, the material exhibits a stick-point of about 30° C indicating encapsulation of the poly(p-chlorostyrene) with the polyvinyl acetate. The material is found to have a particle size range of from 2 to 10 microns.

EXAMPLE V

A solution of about 18 gr polyvinyl alcohol and 900 ml of distilled water is prepared and placed in a 2-liter reaction flask provided with a reflux condenser under constant Argon sparge. The amounts of 60 gr of polystyrene and 1 gr of a nonyl phenyl polyethoxy ethanol are dissolved in methacrylonitrile monomer. The monomer solution is divided into two parts with about ⅓ of the solution employed to dissolve 0.7 gr benzoyl peroxide. About 10 gr of Mogul-L carbon black which has been vacuum dried at 100° C for about one hour is dispersed in the remaining monomer solution employing a Waring blender equipped with a Polytron attachment for about 15 minutes. The two monomer portions are recombined by stirring with the Polytron for about 2 minutes. The monomer phase is dispersed in the aqueous phase at about 800 RPM for 5 minutes employing a simple paddle stirrer. The temperature is then raised to about 60° C and maintained by means of a large water bath while at the same time the stirring rate is slowed to about 500 RPM. The temperature is then gradually raised to 80° C over a 6 hour period after which the temperature is lowered to 25° C. The material is recovered by filtration and after washing with water and drying, the material exhibits a stick-point of about 100° C indicating encapsulation of the polymethacrylonitrile with the polystyrene.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A method of providing encapsulated toner materials comprising dissolving a polymer in a monomer other than the monomer of said polymer which polymer is incompatible with the polymer of the monomer employed to form a solution said polymer being referred to as polymer A; dispensing said solution in a continuous phase; polymerizing the monomer so that polymer A forms a solvent-rich phase which forms the wall of the encapsulated toner material and the resulting polymer being referred to as polymer B forms a solvent-poor phase which becomes the core of the encapsulated toner material, said polymer A, the monomer and polymer B having a very limited solubility in the continuous liquid phase employed for polymerization.

2. The process as defined in claim 1 wherein said polymer A is selected from the group consisting of olefin polymers, halo-olefin polymers, aliphatic vinyl and vinylidene polymers, aromatic vinyl polymers, heterocyclic vinyl polymers, acrylic and methacrylic polymers, polyethers, polysulfides and polysulfones, aliphatic and aromatic polyamides, polyureas, polyurethans, natural and modified natural polymers, and combinations thereof.

3. The process as defined in claim 1 wherein said monomer is selected from the group consisting of acrylic acid and esters thereof, methacrylic acid and esters thereof, acrylonitrile, vinyl and vinylidene halides, vinyl esters, vinyl ethers, styrene and substituted styrenes, and combinations thereof.

4. The process as defined in claim 1 wherein a polymerization initiator is employed.

5. The process as defined in claim 4 wherein said initiator is selected from the group consisting of organic peroxides, organic hydroperoxides, N-nitrosoacylanilides, triphenylmethylazobenzene, and aliphatic azobisnitriles.

6. The process as defined in claim 1 wherein the continuous phase is organic.

7. The process as defined in claim 1 wherein the continuous phase is aqueous.

8. The process as defined in claim 1 wherein a colorant is dispersed in the monomer.

* * * * *